March 24, 1942. L. O. THOMPSON 2,277,534
STEAM PRESSURE GAUGE PROTECTOR
Filed Feb. 23, 1940 2 Sheets-Sheet 1
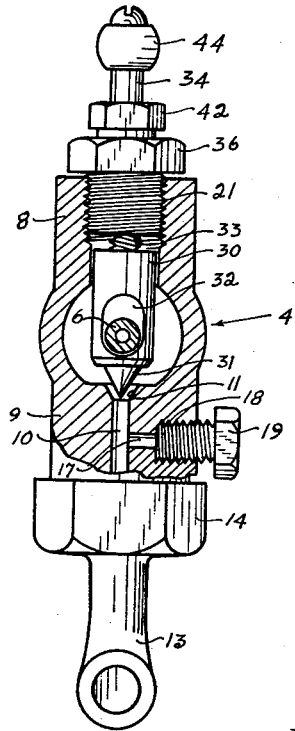
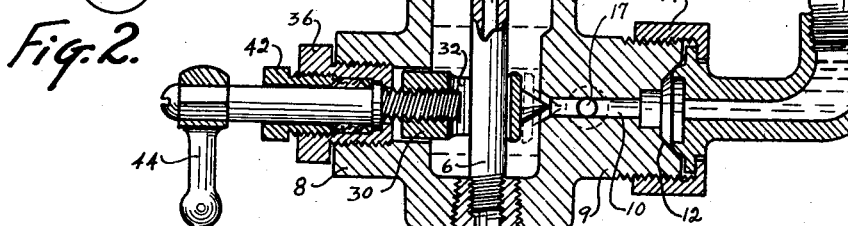
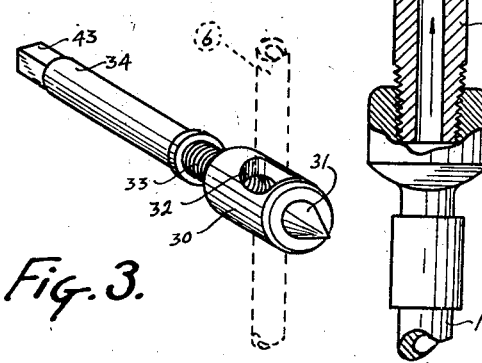
Fig. 1.
Fig. 2.
Fig. 3.
Lester O. Thompson
INVENTOR.
BY Bernard P. Miller
ATTORNEY.

March 24, 1942. L. O. THOMPSON 2,277,534
STEAM PRESSURE GAUGE PROTECTOR
Filed Feb. 23, 1940 2 Sheets-Sheet 2
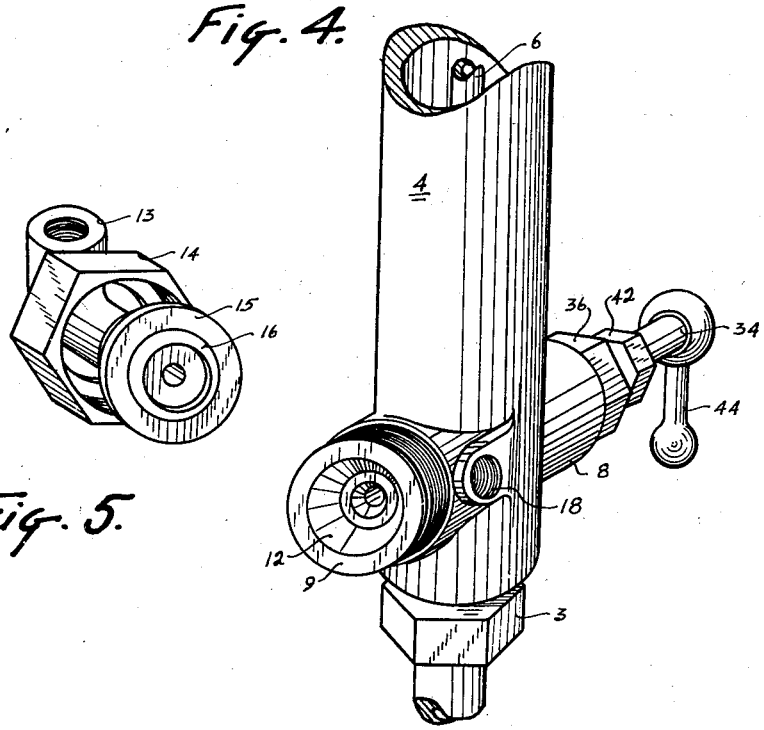
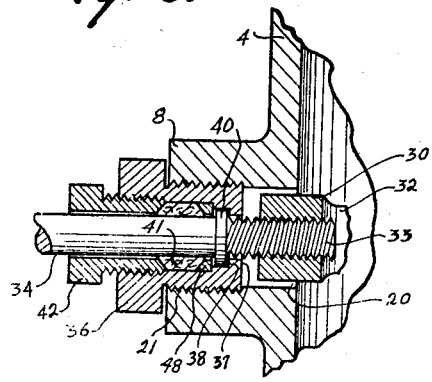
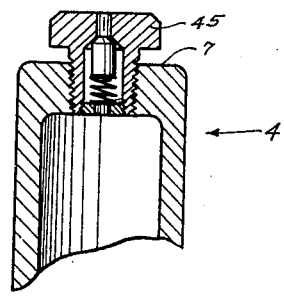
Lester O. Thompson
INVENTOR.
BY Bernard P. Miller
ATTORNEY.

Patented Mar. 24, 1942

2,277,534

UNITED STATES PATENT OFFICE 2,277,534

STEAM PRESSURE GAUGE PROTECTOR

Lester O. Thompson, Oklahoma City, Okla.

Application February 23, 1940, Serial No. 320,379

3 Claims. (Cl. 73—31)

The invention relates to apparatus for protecting boiler pressure gauges from the heat of the steam being gauged, and is an improvement upon apparatus such as that disclosed in U. S. Pat. No. 1,912,954, issued to me on June 6, 1933, for improvement in Steam pressure gauge protector.

Pressure gauges are effected by temperature changes, and consequently when subjected directly to the steam from a boiler, the heat causes them to give a different reading at a given or stable pressure than they would give if no heat was present.

In the above mentioned patent, a device is disclosed which prevents the gauge from becoming heated by contact with the steam, but which permits the pressure of the steam to act upon the gauge mechanism. In that device, the hand operated valve of the protector is subjected to direct contact with the steam, and consequently the valve becomes so hot that it cannot be operated by the naked hand.

One object of the present invention is the provision of a gauge protector mechanism in which the control valve is also protected from the heat of the steam.

In most localities law requires periodical inspection of boiler accessories, such as gauges, relief valves, etc., as well as an inspection of the boiler proper. In inspecting the pressure gauge of a boiler, it is common practice for the inspector to remove the usual gauge and to replace it with his own gauge which is known to be mechanically perfect. In doing this it often occurs that the steam pressure in the boiler changes between the time the regular gauge is removed and the inspector's gauge is installed. This often results in the erroneous conclusion that the regular gauge is inaccurate.

In use of the device disclosed in my above mentioned patent, the inspector's gauge is usually installed in lieu of the check valve in the upper end of the body. This practice submits the inspector's gauge to direct contact with the steam while the regular gauge remains in a cooled condition. The result is that the two gauges do not read identically.

A further object of the present invention therefore, is to provide a gauge protector constructed to permit attachment of the inspector's gauge without removal of the regular gauge and permitting a simultaneous reading of both gauges under like conditions.

Another object of the invention is to provide a gauge protector in which the same medium is used to cool the valve as that used to prevent heat transfer from the steam to the gauge mechanism.

Other objects will be apparent from the following description with reference to the accompanying two-sheet drawings wherein:

Figure 1 is an elevational sectional view of a preferred embodiment of the invention with the pressure gauge installed thereon, the device being operatively connected to a usual steam gauge line;

Figure 2 is a broken horizontal sectional view looking downwardly upon the valve mechanism of Fig. 1, the pressure gauge having been removed;

Figure 3 is a perspective view of the valve stem with the steam inlet tube shown in dotted lines;

Figure 4 is a fragmentary perspective view of the lower portion of the device and detailing the nipple for connecting the gauge supporting fitting;

Figure 5 is a perspective view of the gauge supporting fitting;

Figure 6 is an enlarged section detailing the manner in which the valve stem of Fig. 3 is mounted in the body of the protector; and, Figure 7 is a sectional detail of a check valve used in connection with the device.

Like characters of reference designate like parts in all of the figures.

In the drawings:

The reference numeral 1 indicates a usual steam line leading from a boiler, not shown, and to which a usual steam pressure gauge 2 is ordinarily mounted. The embodiment of the present invention is interposed between the line 1 and the gauge 2, and consists substantially of the following described elements.

A hollow nipple 3 connects at its lower end the upper end of the steam line 1, and the nipple is exteriorly threaded at its upper end to engage the lower end of a hollow body 4. The body 4 forms a chamber for the reception of a cooling liquid 5 such as glycerine, oil or the like. An upstanding tube 6 has its lower end threaded into internal threads within the upper end of the nipple 3, and its upper end is open and terminates below the uppermost closed end 7 of the body 4, and above the level of the liquid 5.

Adjacent its lower end, the body 4 is provided with two oppositely disposed laterally extending cylindrical bosses or projections 8 and 9. The boss 9 has an axial bore 10 which communicates at its inner end with the chamber in the body 4 through a conically tapered aperture 11 which also acts as a valve seat, as will be more fully described hereinbelow.

The outer end of the boss 9 has a conical cavity 12 surrounding the outer end of the bore 10 and a gauge supporting fitting or elbow 13 is held in positive engagement with the boss 9 by a union-nut 14. The end of the elbow 13 which engages the boss 9 has a flat annular machined surface 15 which fits against the end of the boss, and also has an annular machined projection 16 which is arcuate in cross-section and which is adopted to form a fluid tight seal with the wall of the conical cavity 12 when the union-nut is drawn tight.

As may best be seen in Fig. 2, the boss 9 has a horizontal bore 17 lying at right angles to and communicating with the bore 10. The outer end portion of the bore 17 is enlarged and is provided with internal threads 18 for receiving a removable plug 19.

The boss 8 has an axial bore 20 which is somewhat larger in diameter than the bore 10 of the boss 9 and the outer end of which is provided with internal threads 21 for retaining a valve assembly therein.

The valve assembly consists substantially of the following described elements:

A substantially cylindrical valve head or yoke 30 having a conical projection 31 on its inner end, and having a transverse through opening or slot 32 which is somewhat greater in length than the outside diameter of the previously described tube 6. The head 30 has an axial bore which has left hand threads engaging similar threads 33 on the inner end of a valve stem 34.

The portion of the bore of the boss 8 which is provided with the right hand threads 21 receives an exteriorly threaded packing gland 36 having a reduced portion 37 on its inner end forming an outwardly presented annular shoulder 38. A metal packing seating ring or shoulder 40 is provided around the stem 34 against the shoulder 38. Suitable compressable packing 41 surrounds the valve stem and rests against a removable bearing ring 48. A thrust or packing nut 42 acts to compress the packing 41 into sealing engagement with the stem 34, gland 36 and ring 48 to prevent egress of fluid from the housing 4.

The outer end of the valve stem 34 has a polygonal portion 43 which receives an operating handle 44 whereby the stem may be rotated.

An outwardly closing check valve 45 of any suitable design is provided in the upper end 7 of the housing or body 4.

Before the installation of the device the steam line 1, the valve stem 34 is rotated to the right hand to seat the projection 31 within the conical orifice 11 of the bore 10 in the projection 9, in order to close the bore. Seating of the projection 31 takes place due to the fact that the valve head or yoke 30 is held against simultaneous rotation with the stem by the tube 6, which passes through the elongated slot 32 in the yoke. The stem 34 cannot move outwardly because of the ring 40 thereon, and consequently the yoke is forced toward the seat 11.

The check valve 45 is removed and the body 4 is filled with a desired liquid, for instance glycerine, to a level approximately that of the upper end of the tube 6, and the check valve is replaced.

When the device is then installed, the steam from the steam line 1 passes upwardly through the tube 6 and is trapped in the upper end of the body 4 above the level of the liquid 5 consequently the steam exerts a downward pressure upon the liquid around the tube 6.

When the valve stem is then rotated to the left hand to open the valve point 31 out of the seat 11, the glycerine or other liquid 5 will be the agent which contacts the gauging mechanism in the gauge 2 and exerts pressure thereon.

It may readily be seen that not only does the liquid 5 prevent overheating of the gauge mechanism, but in the present structure, it also acts as a cooling agent for the valve assembly. When the valve head 30 is in either an open or closed position it is entirely immersed in the liquid 5, and consequently heat transference from the tube 6 is reduced.

The check valve 45 is provided for permitting ingress of air into the upper end of the body 4, when the pressure therein periodically becomes less than atmospheric, due to steam condensation.

When it is desired to place an inspector's gauge on the device in order to check the correctness of the gauge 2, the plug 19 is removed and the inspector's gauge is installed in lieu thereof in an obvious manner. The two gauges may therefore be read simultaneously. Since the bore 17 is located below the level of the liquid 5, the liquid acts as a medium for exerting pressure upon the inspector's gauge as well as upon the gauge 2. Therefore if the two gauges are in proper order they will give identical readings since both are read at the same temperature.

From the foregoing description it will be apparent that the objects of the invention as set forth hereinabove are accomplished by the device.

I claim:

1. A protector for steam pressure gauges comprising: an upright container for liquid; a tube within the container extending upwardly from its bottom and terminating below the top thereof; a steam line connected to the lower end of the tube; liquid in the container below the upper end of the tube; a lateral passage leading from the lower portion of the container and adapted at its outer end to connect a steam pressure gauge; a valve seat at the inner end of said passage; and, a valve head encircling the tube and being manually movable toward and away from the seat, said head extending through the container and being immersed in and cooled by the liquid.

2. A protector for steam pressure gauges comprising: a container for liquid; a tube within the container extending upwardly from its bottom and terminating below the top thereof, said tube adapted at its lower end for connection to a steam line; liquid in the container below the upper end of the tube; a lateral passage leading from the lower portion of the container and adapted at its outer end to connect a steam pressure gauge; a valve seat at the inner end of said passage; and, a valve head straddling the tube within the container, and manually movable toward and away from the seat, said head immersed in and cooled by the liquid.

3. Organization as described in claim 1, in which there is a second passage leading from the first, upon which an auxilliary steam pressure gauge may be installed.

LESTER O. THOMPSON.